Feb. 23, 1965 J. A. RAJCHMAN 3,171,100

PUNCHABLE MEMORY CARD HAVING PRINTED CIRCUIT THEREON

Filed March 21, 1962 4 Sheets-Sheet 1

INVENTOR.
JAN A. RAJCHMAN
BY
Carl V. Olson
Attorney

PUNCHABLE MEMORY CARD HAVING PRINTED CIRCUIT THEREON

Filed March 21, 1962 4 Sheets-Sheet 2

INVENTOR.
JAN A. RAJCHMAN
BY
Carl V. Olson
Attorney

INVENTOR.
JAN A. RAJCHMAN
BY
Carl V. Olson
Attorney

Feb. 23, 1965 J. A. RAJCHMAN 3,171,100

PUNCHABLE MEMORY CARD HAVING PRINTED CIRCUIT THEREON

Filed March 21, 1962 4 Sheets-Sheet 4

INVENTOR.
JAN A. RAJCHMAN
BY
Carl V. Olson
Attorney

United States Patent Office 3,171,100
Patented Feb. 23, 1965

3,171,100
PUNCHABLE MEMORY CARD HAVING PRINTED CIRCUIT THEREON

Jan A. Rajchman, Princeton, N.J., assignor to Radio Corporation of America, a corporation of Delaware
Filed Mar. 21, 1962, Ser. No. 181,381
4 Claims. (Cl. 340—173)

This invention relates to memories such as are used for the storage of information in digital form, and particularly to fixed, content addressable memories.

A fixed memory is one in which information is stored in a permanent manner, as by means for punched holes in a card or by means of selectively wired diodes in a matrix of conductors. A content addressable memory is one from which a certain desired word can be retrieved without knowing the location of the word. At least a part (tag bits) of the desired word or words must be known. The entire memory is addressed with the known part of the word. This results in retrieval of the remainder (data bits) of the selected word or words. Fixed, content addressable memories can be very useful in the electronic processing of lists of information. For example, each line of an insurance company's list of policy numbers and corresponding policyholders' names and premium due dates may be stored as one word in a fixed memory. The entire memory can be addressed with the part of the word representing a given premium due date for the purpose of retrieving all of the corresponding policy numbers and policy holders' names.

It is an object of this invention to provide an improved fixed memory which can be economically constructed using automated printing techniques.

It is another object to provide an improved electrically content addressable memory wherein any one or ones of the word bit locations can be considered as tag bit locations for interrogating the entire memory to retrieve the word or words having the selected tag bits.

It is a further object to provide an improved fixed memory wherein information is stored by punching holes in a card having an electrical circuit printed thereon so that sensing of the stored information can be done by means sensing the electrical circuit without moving the individual cards, or can be done by means sensing the punched holes in each individual card.

It is yet another object to provide an improved fixed, electrically content addressable memory made up of a stack of punched cards which may be conveniently added to, subtracted from and sorted.

In one aspect of the invention, an insulated supporting card is provided with printed row conductors each connected at one end through a printed resistor to a printed column bias bus, printed column conductors insulated from the row conductors, and printed non-linear impedance elements each as diodes located at electrical crossovers of the row and column conductors and connected therebetween. The geometry of the diodes and their connections to row and column conductors is such as to be altered for the permanent storage of information by the punching of holes through printed elements and the card. The location of a punched hole determines the effective electrical connection of a diode and determines whether the bit of stored information is a "1" or a "0." The information stored on a punched card can be sensed by means responsive to the location of the punched holes. The printed circuit on the punched card includes conductor terminal ends adapted for contacting corresponding terminal ends of an adjacent card when a number of punched cards are arranged in a stack. The information stored in a stack of punched cards may be selectively retrieved in a content addressable manner by electrical means connected to the conductor terminal ends.

The column conductors on each card are arranged in pairs. Each storage location includes a printed diode connected between a corresponding row conductor and one or the other of the column conductors of a pair. The column conductor of a pair to which the diode is connected determines whether the stored information is a "1" or a "0." Each row conductor is connected through a printed resistor to a column bias bus. The column bias bus and the conductors of the column pairs have conductor terminal ends for contacting corresponding ends of an adjacent card when the cards are arranged in a stack. Electrically content addressing an individual card or a stack of cards is accomplished by means for biasing the column conductor pairs to determine which pairs are to correspond with tag bits of a desired word or words in the memory, means to interrogate the tag bits of all the words in the memory, and means to derive the remaining data bits of the word or words having the desired tag bits.

These and other objects and aspects of the invention will be apparent to those skilled in the art from the following more detailed description taken in conjunction with the appended drawing, wherein.

Figure 1:
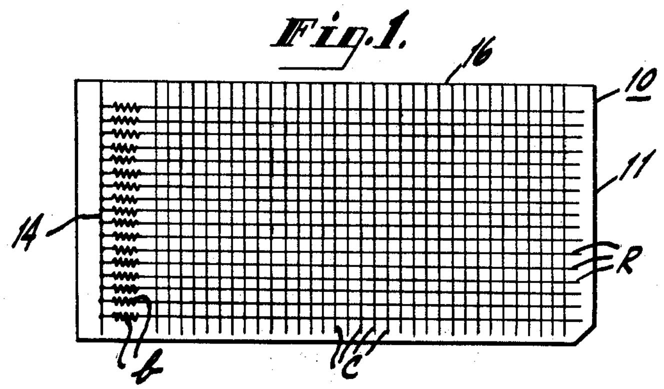
FIGURE 1 shows one side of a memory card according to the invention having printed conductors and resistors, the printed diodes on the card being omitted because of the small scale of the figure.
Figure 3:
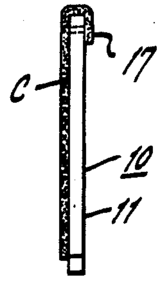
FIGURE 3 is an edge view of the memory card of FIGURES 1 and 2.
Figure 2:
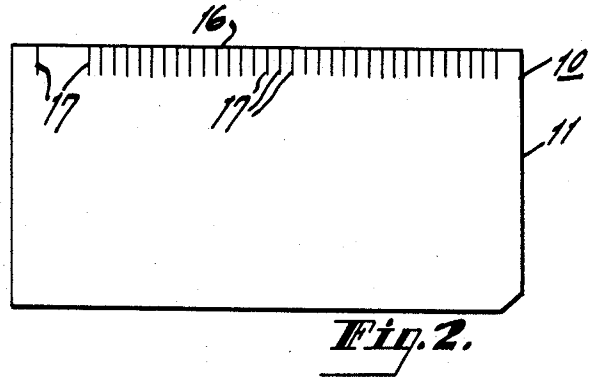
FIGURE 2 shows conductor terminal ends printed on the other side of the memory card of FIGURE 1.

Reference will now be made in greater detail to FIGURES 1, 2 and 3 showing three views of a memory card 10. The memory card 10 includes a punchable insulating supporting card sheet 11 made of a material such as a coated or impregnated card paper or a sheet plastic. As shown in FIGURE 1, one side of the card 11 has printed thereon a plurality of row conductors R each having one end connected through printed resistors *b* to a column bias bus 14. A plurality of column conductors C is also printed on the card with an insulating layer (not shown) intervening between the column conductors and the row conductors at their crossovers so that they are electrically insulated from each other. The column bias bus 14 and the column conductors C are extended at one edge 16 of the card 11 to form conductor terminal ends 17 on the opposite side of the card as is shown in FIGURES 2 and 3. The conductor terminal ends 17 may be connected near the edge 16 of the card as shown, or alternatively may be connected through the card at points near the edge 16.

Figure 4:
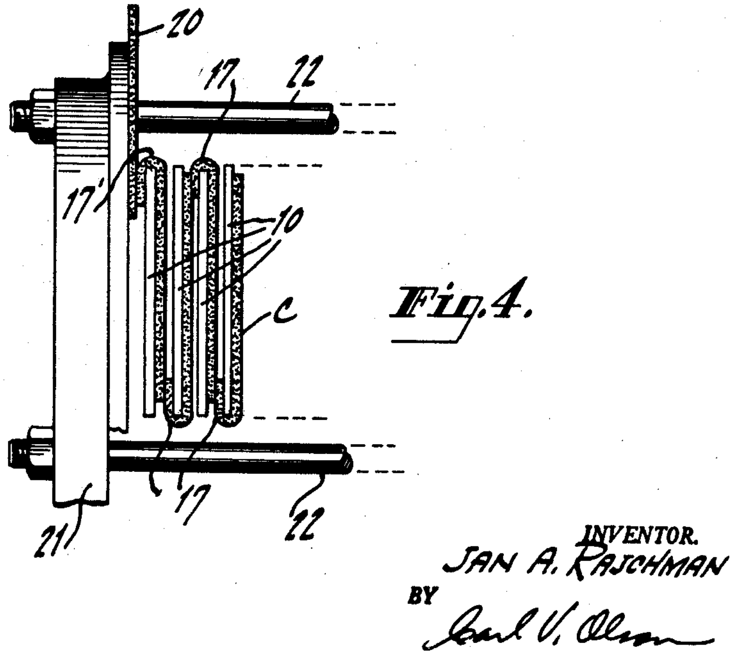
FIGURE 4 is a fragmentary view of a plurality of cards according to FIGURES 1, 2 and 3 arranged in a stack which permits the electrical content address retrieval of information stored in all the cards of the stack.

FIGURE 4 illustrates fragmentarily one end of a memory stack of cards of the type shown in FIGURES 1, 2 and 3. The cards 10 are stacked in an alternating fashion so that the conductor terminal ends 17 of each card electrically contact the corresponding column conductors C and column bus 14 of an adjacent memory card. A plurality of stack terminals 20 corresponding in number to the number of column conductors C plus one column bias 14 is arranged to electrically contact the conductor terminal ends 17' of the end one of the cards 10. The arrangement is one wherein the plurality of stack terminals 20 is individually in series circuit with the corresponding column conductors C of all of the memory cards 10 in the stack. The cards 10 are held in the tight contacting relationship shown by means of any suitable clamp such as that illustrated in part by the clamp plate 21 and the bolts 22.

Figure 5:
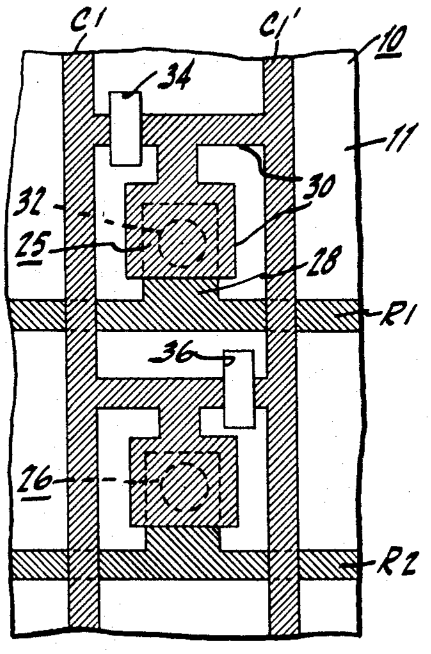
FIGURE 5 is a detailed fragmentary view of a portion of the memory card of FIGURE 1 showing a geometrical arrangement of printed conductors, printed diodes and punched holes.

Printed diodes not shown on the small scale view of FIGURE 1 are illustrated inn the fragmentary detailed view of FIGURE 5. The supporting card 11 is provided with printed row conductors R1 and R2 and is provided with a column conductor pair including individual printed column conductors C1 and C1'. The column conductors are insulated from the row conductors at their crossovers by any suitable electrical insulating layer (not shown).

A printed diode 25 is provided in FIGURE 5 at the memory location constituted by the crossover of the row conductor R1 and the column conductor pair C1, C1'. A similar printed diode 26 is located at a crossover of the row conductor R2 and the column conductor pair C1, C1'. The printed diode 25 includes a terminal 28 connected to the row conductor R1, a terminal 30 connected initially to both of the column conductors C1 and C1', of the pair, and an intervening material 32 which exhibits a non-linear impedance or rectifying characteristic. The initial connection of the terminal 30 of the diode 25 to the column conductor C1 is interrupted by a punched hole 34 extending through a portion of the terminal 30, and extending through the insulating supporting card 11. The diode 25 thus remains connected between the row conductor R1 and the column conductor C1'. The similar printed diode 26 is connected, as determined by the punched hole 36, between the column conductor C1 and the row conductor R2.

All the printed diodes on the card have a terminal 30 initially connected to both of the column conductors C1 and C1' of the corresponding column pair, the connection of each diode to one of the conductors of the column pair being interrupted by a punched hole. Each diode memory location stores a "1" or a "0" depending on which one of the column conductors C1 and C1' that terminal 30 of the diode remains connected to. The position of the punched hole at each memory bit location indicates whether a "1" or a "0" is stored in that location. Therefore, the information stored on a punched card 10 can be sensed by apparatus responsive to the positions of the punched holes in the mechanical supporting card 11.

Figure 6:
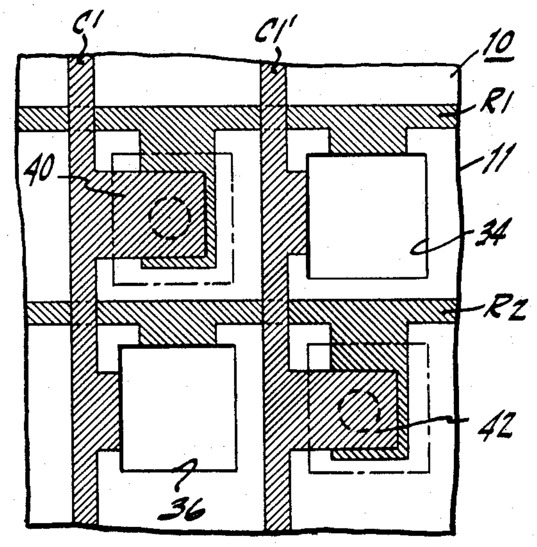
FIGURE 6 is a detailed fragmentary view of a portion of the memory card of FIGURE 1 showing another alternative geometrical arrangement of printed conductors, printed diodes and punched holes.

FIGURE 6 is a fragmentary view of a printed circuit pattern on a supporting card 11 which is similar to the printed circuit pattern in the arrangement of FIGURE 5 in including row conductors R1 and R2 and a pair of column conductors C1 and C1'. The geometry of FIGURE 6 differs in that a printed diode is provided at the crossover of each row conductor and each column conductor. A printed diode 40 is shown connected between the row conductor R1 and the column conductor C1. The diode (not shown) initially printed and connected between the row conductor R1 and the other conductor C1' of the column conductor pair has been removed by being punched out leaving the hole 34 through the supporting card 11. Similarly, a diode 42 remains connected between the row conductor R2 and the column conductor C1', whereas the diode originally connected between the row conductor R2 and the column conductor C1 has been punched out leaving a hole 36.

The arrangement of FIGURE 6 is similar to that of FIGURE 5 in that each memory bit storage location includes a diode connected between the corresponding row conductor R and one or the other of the conductors C1 and C1' of the column conductor pair. The one of the conductors C1 and C1' to which the diode is connected determines whether the information stored is a "1" or a "0." The location of the holes 34 and 36 is indicative of whether the information stored is a "1" or a "0." Therefore, the punched card patterns illustrated in FIGURES 5 and 6 are patterns which permit the punched cards to be passed through a hole sensing or punched card reader apparatus for the purpose of reading the stored information, sorting the cards, etc. In other words, the punched cards illustrated in FIGURES 1 through 6 are capable of being used in the same general manner as the commonly used punched paper cards not having printed electrical circuits thereon.

The printed row conductors R1, resistors *b*, column bus 14 and column conductors C may be printed by brushing, spraying, painting, stenciling, evaporation, or other suitable printing techniques. The terminals 28 and 30 (FIGURE 5) of the diodes may be similarly formed. Likewise, the non-linear impedance or rectifying material 32 may be formed between the time of formation of the two terminals. The interposed mateerial 32 which cooperates with the terminals 28 and 30 to constitute a non-linear impedance unidirectionally conductive device may be an organic material such as certain phthalocyanines in the form of small crystallites, pressed powders or thin films. The rectifying characteristics of the device may depend on the thickness of the organic material, the material used for the terminals, and the area of contact between the organic material and the terminals.

Figure 7:
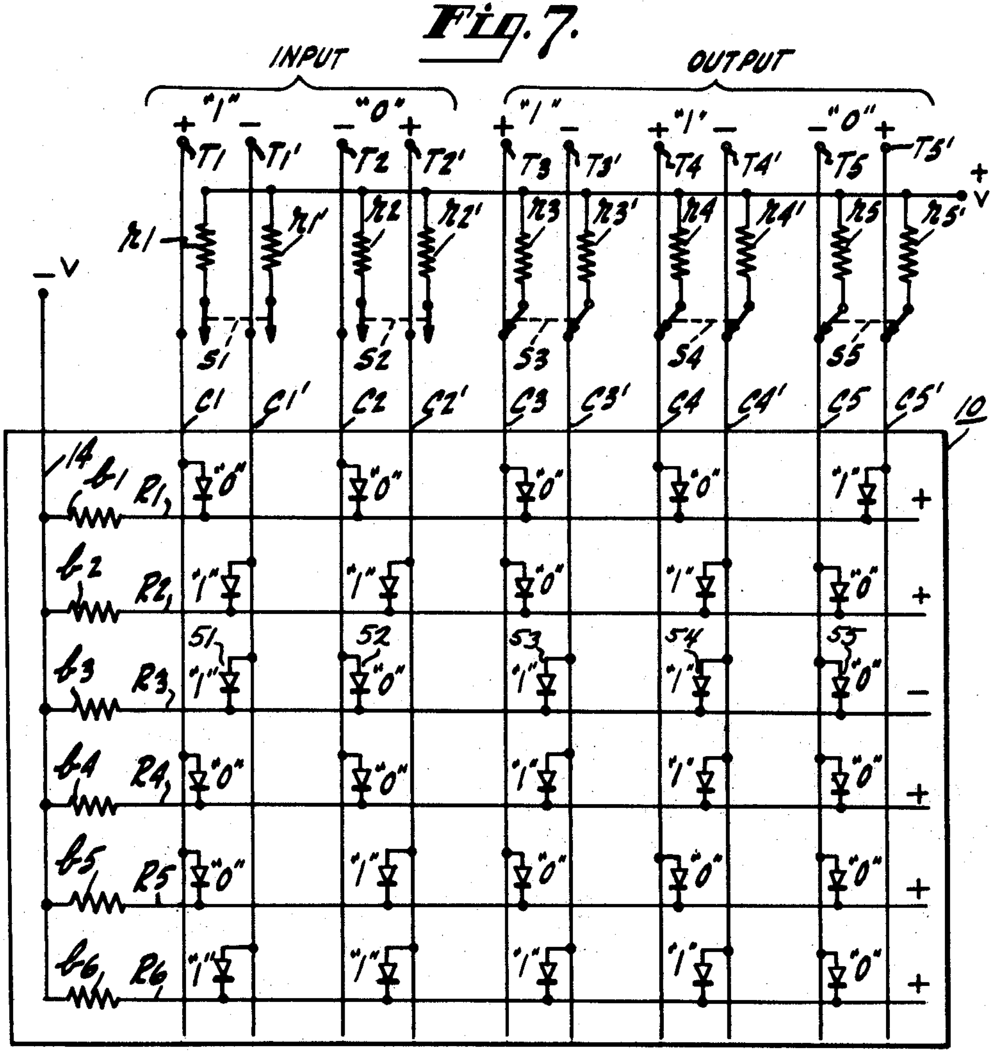
FIGURE 7 is an electrical circuit diagram illustrating the electrical circuit elements on the memory card of FIGURE 1, and means external of the memory card for electrically content addressing the information stored in the memory cards.

FIGURE 7 will now be referred to for an explanation of how the information stored in the punched cards shown in FIGURES 1 through 6 may be read out electrically, as contrasted with being read out by sensing the holes in the card. The fixed memory card 10 is illustrated as having row conductors R1 through R6 each having ends connected through respective resistors *b*1 through *b*6 to a column bias bus 14 having pairs of column conductors C1, C1' through C5, C5'. A diode is shown connected at each crossover of a row conductor and a column conductor pair, each diode being connected between a row conductor and one or the other of the conductors of a column pair. The diodes are indentified in FIGURE 7 as storing a "1" or a "0" depending on the diode connection. The particular information shown as being stored by the diode connections is illustrative and is for the purpose of facilitating an explanation of the operation of the memory. The diodes connected to each row conductor R represent the digits or bits of one word. The card 10 as shown in FIGURE 7 is illustrative of a single card according to FIGURE 1, or a stack of such cards arranged as shown in FIGURE 4 with the column bias bus 14 and the column conductor C electrically connected to corresponding conductors in all of the cards of the stack in series.

FIGURE 7 also shows circuitry for connection to the printed circuits on the card 10 for electrically content addressing the memory to retrieve or read out selected information words stored in the card 10. The negative terminal —V of a bias source is connected to the column bias but 14 on the card 10. The column conductor pairs C1, C1' through C5, C5' on the card 10 are connected to respective input-output terminal pairs T1, T1' through T5, T5'. The positive terminal +V of a bias source is connected through respective resistor pairs *r*1, *r*1' through *r*5, *r*5', and through conductor pair switches S1 through S5 to the respective column pairs C1, C1' through C5, C5'. The switches S1 through S5 are single-throw, double-pole switches used for the purpose of determining which of the bits of the words stored in the memory card 10 shall be considered tag bits for interrogation purposes, and which shall be considered data bits sought to be retrieved as the part of a word or words having the tag bits looked for.

In the operation of the system of FIGURE 7, the bit selection switches S1 and S2 are in the open position signifying that the two bits corresponding to the column conductor pairs C1, C1′ and C2, C2′ are to be used as tag bits in interrogating the content addressable memory. The bit selection switches S3, S4 and S5 are in the closed positions connecting the +V bias through respective resistors *r*3 through *r*5′ to the corresponding column conductor pairs. The closed position of these switches indicates that the data bits corresponding with the column conductor pairs C3, C3′ through C5, C5′ are to be delivered by the memory to the output terminals T3, T3′ through T5, T5′. It will be understood that while the terminal pairs T1, T1′ and T2, T2′ are used as input terminals for applying tag bit information, and the remaining terminals are data bit output terminals, this is determined entirely by the positions of the switches S1 through S5. Any other combination of input and output bits may be obtained by appropriately positioning the switches.

In the example of FIGURE 7, the memory card 10 is interrogated for a word in which the first two bits are tag bits, the first bit being a "1" and the second bit being a "0". The interrogation of the first bit column for a "1" is performed by applying a positive input voltage to terminal T1 and a negative input voltage to terminal T1′. The interrogation of the second bit column for a "0" is accomplished by applying a negative input voltage to the terminal T2 and a positive input voltage to the terminal T2′.

The word stored in the memory card along row conductor R3 is the only one of the six stored words satisfying the input tag information by having a diode 51 in the first bit location connected for storing a "1" and a diode 52 in the second bit location connected for storing a "0." The selected row conductor R3 is the only row conductor which remains at a negative potential because it is the only row conductor having tag bit diodes connected at both terminals to negative potentials, i.e., the negative potential at the −V bias terminal and the negative potentials at the tag bit input terminals T1′ and T2. The row conductor R1 is raised to a positive potential by reason of a current flow from the positively energized terminal T1 through a diode to row conductor R1, resistor *b*1, and bias bus 14 to the −V terminal. The row conductor R2 is raised to a positive potential by the flow of current from the positively energized input terminal T2′ through a diode, the resistor *b*2 and the bias bus 14 to the terminal −V. Similarly, the row conductors R4, R5 and R6 are raised to a positive potential by the flow of current from the positively energized input terminals T1 and/or T2′ through one or two diodes, through the corresponding row conductor and the corresponding resistors to the bias bus 14 connected to the terminal −V.

Since the row conductor R3 is the only row conductor remaining at a negative potential, the word searched for and satisfying the first two tag bits "1 0" is located along row conductor R3. The corresponding data bits of the selected word along row conductor R3 are presented at the data bit output terminals T3, T3′ through T5, T5′. The data bits of the stored word are "1 1 0" as determined by the connections of the diodes 53, 54 and 55. The "1" output at output terminals T3 and T3′ is indicated by a positive potential on terminal T3 and a negative potential on terminal T3′. The positive potential on terminal T3 is due to the connection of the +V bias source through resistor *r*3 and switch S3 to the column conductor C3. The negative potential on terminal T3′ is and the third coil of any one of the three coil relays in series with the P–1 coil of the test relay 30 will hold due to the connection of the +V bias source through resistor *r*3′, switch S3, column conductor C3′ and diode 53 to the negative row conductor R3. The voltage drop in resistor *r*3′ makes the terminal T3′ negative.

The "1" output at output terminals T4 and T4′ is represented by a positive potential at terminal T4 due to the connection of the +V bias through resistor *r*4 to terminal T4, and is represented by a negative potential at terminal T4′ due to the voltage drop in resistor *r*4′ resulting from current flow from the +V bias source through resistor *r*4′, column conductor C4′, and diode 54 to the negative row conductor R3.

The "0" output at terminals T5 and T5′ is represented as a negative potential at terminal T5 due to the voltage drop in resistor *r*5 resulting from current through diode 55 to the negative row conductor R3, and is represented by a positive potential on terminal T5′ due to the connection of the +V bias through *r*5′ to terminal T5′.

It is thus seen that, in the example of FIGURE 7, the application of input signals to the tag bit terminals T1, T1′ and T2, T2′ constitutes the content addressing of the memory, and that the data bits of a word stored in the memory satisfying the tag bit interrogation automatically become available at the data bit output terminals T3, T3′, T4, T4′ and T5, T5′. The switches S determine which bits of the words are tag bits and which are data bits. If the fixed memory contains more than one word having the same tag bits, more than one row conductor remains at a negative potential, and additional circuitry (not shown) is needed to read out the data bit portions of the selected words in time sequence.

Figure 8:
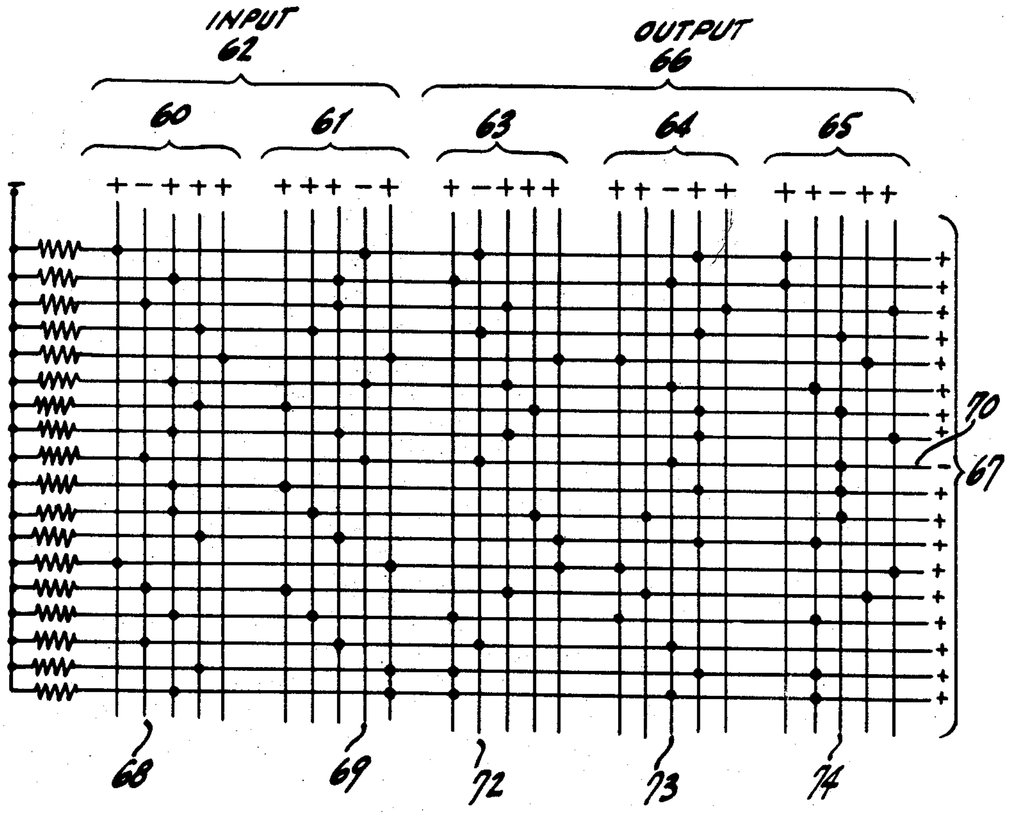
FIGURE 8 is an electrical circuit diagram illustrating an electrical content addressable memory arranged to employ the one-out-of-five code.

FIGURE 8 illustrates that the invention is not limited to arrangements utilizing the binary or one-out-of-two code, but is also applicable to other codes such as, for example, the one-out-of-five code. In the arrangement of FIGURE 8, the column conductor groups 60 and 61 are assumed to correspond to tag inputs, and the column conductor groups 63, 64 and 65 are assumed to correspond with data outputs. The ones of the groups of five column conductors which are input groups, and the ones which are output groups, are determined by the positions of switches (not shown) like those in the arrangement of FIGURE 7. Row conductors 67 cross the column conductors. Diodes (not shown) are provided at each crossover marked with a dot in the drawing. Each of the row conductors 67 is connected through a diode to one of the five column conductors of each of the groups 60, 61, 63, 64, 65 to represent the fixed storage along each row conductor of a word in the one-out-of-five code. If diodes are printed at every crossover of a row conductor and the five column conductors of a group, all but one of the diodes in each group are punched out or disconnected.

In addressing the memory, all of the input column conductors 60 are positively energized except one conductor, for example, 68 which is negatively energized. All of the input conductors 61 are positively energized except, for example, the column conductor 69 which is negatively energized. The row conductor 70 is the only row conductor having diodes connected to both of the negatively energized conductors 68 and 69. Therefore, row conductor 70 is the only row conductor which remains negatively energized indicating that the word permanently stored along it is the selected word in the memory. The negatively energized row conductor 70 causes the negative energization of the column conductor 72 in the column conductor group 63, the column conductor 73 in the column conductor group 64, and the column conductor 74 in the column conductor group 65, due to the location of the diodes along the row conductor 70. The remainder of the output column conductors remain positively energized. In this way, the input information applied to the tag bit conductor groups 60 and 61 results in the selection of the word along row conductor 70 and the retrieval of the data bits of the selected word on the output conductor groups 63, 64 and 65.

What is claimed is:

1. A punched card for the storage of information comprising an insulating supporting card, a plurality of row conductors printed on the card, a plurality of column conductor pairs printed on said card and insulated from said word row conductors, and printed diodes located on said card at crossovers of row conductors and column conductor pairs, each of said diodes having a first terminal connected to a corresponding row conductor and having a second terminal connected to both conductors of a corresponding column conductor pair, the connection of said second terminal to one of the column conductors of the pair being interrupted by a punched hole going through the connection and the card, whereby each diode represents the storage of a "1" or a "0" depending on whether it remains connected to one or the other of the conductors of the corresponding column pair.

2. A punchable card for the storage of information comprising a supporting card, a plurality of word row conductors printed on the card, a column bias bus printed on said card, individual resistors printed on said card connecting the ends of respective ones of said row conductors to said bias bus, a plurality of bit column conductor pairs printed on said card and insulated from said word row conductors, a printed diode located on said card at the crossover of each row conductor and column conductor pair, each of said diodes having one terminal connected to the corresponding row conductor and having another terminal connected to both of the conductors of the corresponding column pair, the connection of the diode to one of the other of the two conductors of the column pair being adapted to be interrupted by a punched hole going through the connection and the card.

3. A punched card for the storage of information comprising a supporting card, a plurality of word row conductors printed on the card, a column bias bus printed on said card, individual resistors printed on said card connecting the ends of respective ones of said row conductors to said bias bus, a plurality of bit column conductor pairs printed on said card and insulated from said word row conductors, a printed diode located on said card at the crossover of each row conductor and column conductor pair, each of said diodes having one terminal connected to the corresponding row conductor and having another terminal connected to both of the conductors of the corresponding column pair, the connection of the diode to one of the two conductors of the column pair being interrupted by a punched hole going through the conductor and the card, whereby each diode represents the storage of a "1" or a "0," depending on whether it remains connected to one or the other of the conductors of the column pair.

4. A fixed, content-addressable memory comprising a supporting card, a plurality of word row conductors on the card, a column bias bus on said card, first individual resistors on said card each connecting the ends of respective ones of said row conductors to said bias bus, a first bias source connected to said bias bus, a plurality of bit column conductor pairs on said card and insulated from said word row conductors, a printed diode located on said card at the crossover of each row conductor and column conductor pair, each of said diodes having one terminal connected to the corresponding row conductor and having another terminal connected to one or the other of the conductors of the corresponding column pair, whereby the connection of each diode represents the storage of a "1" or a "0" depending on whether it is connected to one or the other of the conductors of the column pair, a second second bias source, individual resistors each connected at one end to said second bias source, switch means for connecting the other ends of said second resistors to respective ones of the conductors of said column conductor pairs, said switch means determining which column conductor pairs of the memory correspond to tag bits and which correspond to data bits, and means to address the memory by energizing pairs of column conductors corresponding to tag bits, whereby a word row conductor is selected and the data bits of the selected word are caused to appear on the data bit column conductor pairs.

References Cited in the file of this patent

UNITED STATES PATENTS

| | | |
|---|---|---|
| 2,353,001 | Armbruster | July 4, 1944 |
| 2,598,155 | Betts | May 27, 1952 |
| 2,872,664 | Minot | Feb. 3, 1959 |